United States Patent [19]
Cardin, Sr.

[11] 3,782,761
[45] Jan. 1, 1974

[54] LOCKING HITCH BOX COVER

[76] Inventor: Carl J. Cardin, Sr., 425 W. Grace St., Punta Gorda, Fla. 33950

[22] Filed: July 23, 1971

[21] Appl. No.: 165,634

[52] U.S. Cl. .................................. 280/507, 70/169
[51] Int. Cl. .............................................. B60d 7/00
[58] Field of Search ................... 280/507, 433, 434; 70/169, 360, 232; 138/89

[56] References Cited
UNITED STATES PATENTS

| | | | |
|---|---|---|---|
| 824,913 | 7/1906 | Cumming | 70/169 |
| 2,630,699 | 3/1953 | Langdon | 70/232 |
| 2,934,184 | 4/1960 | Moser | 138/89 |
| 3,161,037 | 12/1964 | Lagerquist | 138/89 |
| 3,271,050 | 9/1966 | Saunders | 280/507 |
| 3,605,457 | 9/1971 | Foster | 280/507 X |

Primary Examiner—Leo Friaglia
Assistant Examiner—Reinhard J. Eisenzopf

[57] ABSTRACT

A locking hitch box cover, for a hitch box having an open end and an opening in a side thereof, comprising a body shaped for insertion in the open end of the hitch box, a key operated locking mechanism attached to said body and having a part biased to enter the opening in the hitch box upon insertion of the body into the hitch box to restrain the body from withdrawal from the hitch box, and key actuated means comprising a part of the locking mechanism to restrain retraction of the part from the opening. The body includes first, second, third and fourth walls with the locking mechanism mounted on the fourth wall. The fourth wall is free at one end and biased away from the first wall to hold two walls against opposed faces of the hitch box.

3 Claims, 3 Drawing Figures

PATENTED JAN 1 1974 3,782,761

LOCKING HITCH BOX COVER

This invention relates to a trailer hitch box cover which is held in place by a locking mechanism that is attached to one of the flexible sides of the hitch box cover and requires a key to lock the hitch box cover in place and to unlock the hitch box cover before removing the hitch box cover from the hitch box.

The present invention relates to trailer hitches particularly the towing vehicle mounted hitch box into which the tongue of the towed vehicle is inserted and attached, and has among its objects and advantages the provision of an improved hitch box cover.

Hitch box covers provide a useful function in that they prevent the entrance of dirt, and destructive road materials into the hitch box as well as masking the unsightly appearance of the uncovered end of the hitch box.

In the past the hitch box covers have been fastened to the hitch box by friction, a screw, or by a bolt and cotter pin. For such reasons the hitch box covers have been lost because of theft or vibration.

Accordingly an object of the present invention is to provide a hitch box cover of such construction as to prevent loss thereof due to theft or vibration.

Another object is to provide a hitch box cover which may be effectively secured to the hitch box without requiring any alteration in the structure of the usual hitch box.

A further object is to provide a hitch box cover adapted for use with conventional hitch box design and in which the hitch box cover is provided with a locking mechanism feature.

A further object is to provide a hitch box cover with a locking mechanism and with material and such that all parts of the hitch box cover are rust proof.

Further and more specific objects of the invention will be apparent from the following description taken in connection with the accompanying drawings in which.

Figure 1:
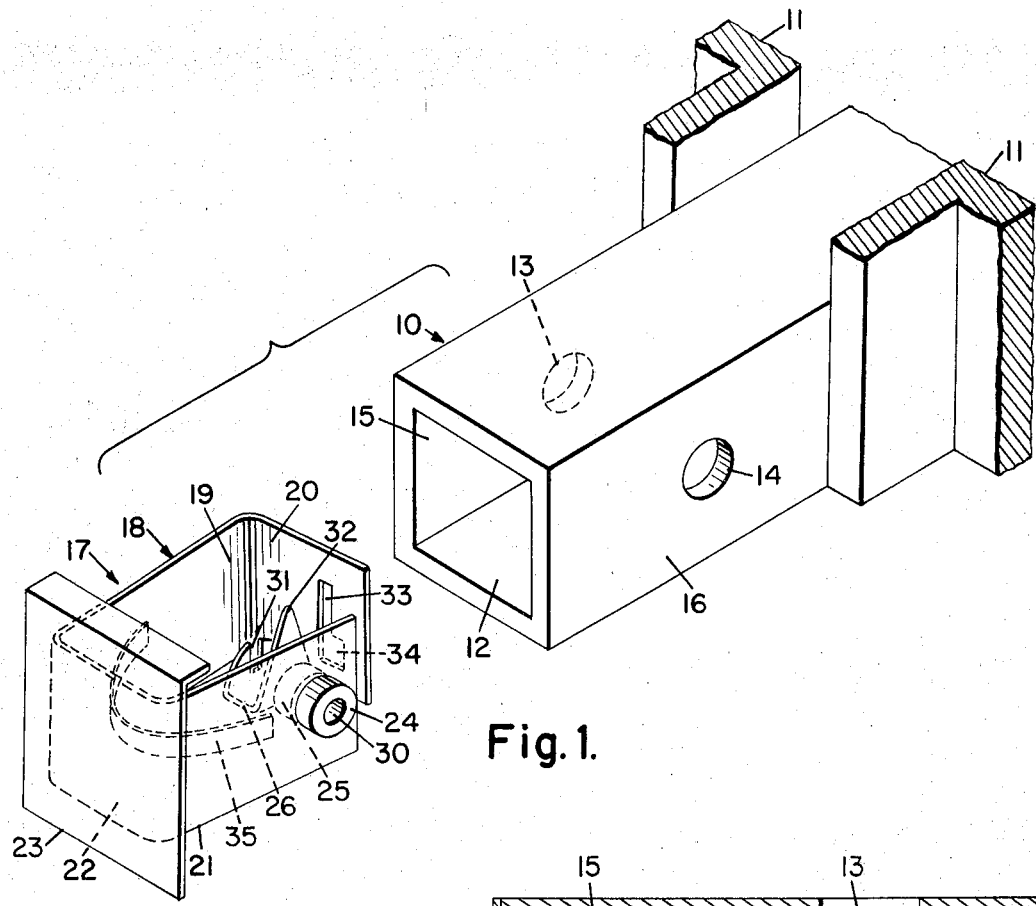
FIG. 1 is an isometric view of the hitch box cover showing the hitch box cover in an unlocked position and aligned for insertion into the hitch box.
Figure 2:
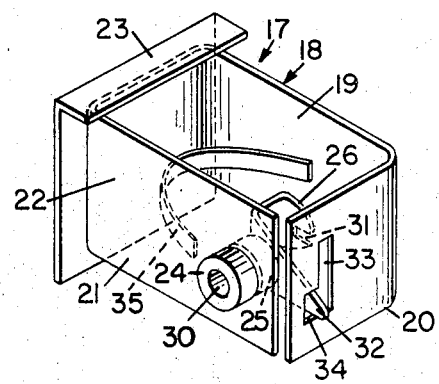
FIG. 2 is an isometric view of the hitch box cover showing the hitch box cover in its locked position.
Figure 3:
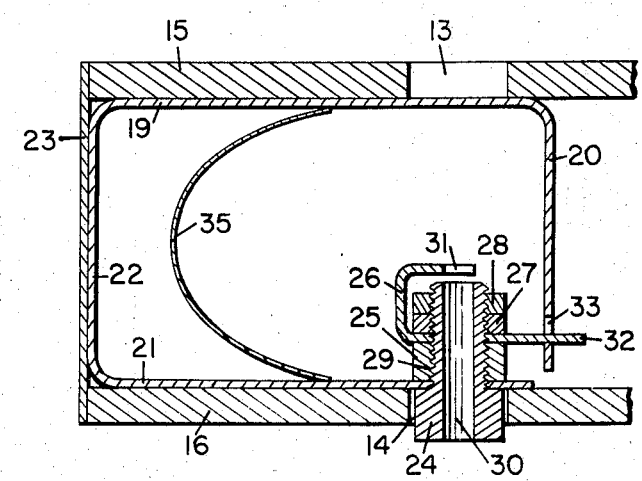
FIG. 3 is a cross sectional view of the hitch box cover and the hitch box showing the locked relationship between the hitch box cover and the hitch box.

In the drawings a conventional hitch box is shown at 10, which box may be welded, or otherwise suitably attached to support 11 of a towing vehicle. The hitch box is generally square or rectangular in cross section and has an open end 12 so as to provide a socket for the tongue of a trailer hitch. Openings 13 and 14 are provided in walls 15 and 16 respectively for reception of the usual bolt (not shown) which connects the tongue of the trailer hitch with the hitch box. The structure so far described is old and well known in the art and need not be described in further detail.

In FIG. 1 the body 18 is of such size and shape as to fit inside the hitch box and comprises a single strip of suitably flexible sheet metal bent to provide walls 19, 20, 21 and 22. The facing 23 is attached to wall 22 by welding or other suitable means. Walls 19 and 21 are positioned at slight obtuse angles to wall 22 and wall 20 is positioned at right angles to wall 19 but wall 21 is a continuation of wall 22 and is unattached with respect to wall 20. Thus the walls 19 and 21 must be moved or flexed inwardly toward each other to permit insertion of body 18 into the hitch box. Since the width of wall 22 is such that when the walls 19 and 21 are parallel, they will fit snugly against the walls 15 and 16 respectively.

To the body end 22 is attached a cover facing 23 of a size slightly greater than the outside end dimensions of the hitch box to serve as an attractive closure therefor.

The locking mechanism of the hitch box cover is attached to wall 21 and most of it is located between walls 19 and 21. This mechanism comprises a cylindrically headed bolt 24 which is threaded the full length of the head. The bolt passes thru an opening 29 properly located in wall 21 and is held in place by a nut 25 to wall 21. A locking line 26 has a circular hole just large enough so that it can slide over the threaded bolt 24, nut 27 is now screwed in place so as to just allow free rotation of link 26, nut 28 acts as a locking nut to hold nut 27 in its proper location. In bolt 24 there is a circular hole 30 that passes all the way thru it and parallel to its axis. A strap like key (not shown) passes thru the bolt and engages into the rectangular slot 31 in the locking link 26 for the purpose of rotating the locking link 26. The bolt 24 is so mounted on wall 21 in such a position that when the body 18 is pushed all the way into the hitch box the cylindrical head of the bolt 24 will snap into the opening 14 in the wall 16 due to the need to flex the walls 19 and 21 inwardly in order that the end of the bolt head will slide along the inside of wall 16 until it comes in alignment with opening 14.

To lock the hitch box cover in the hitch box to prevent loss due to vibration or theft, the locking link 26 is turned by the the strap like key which passes thru opening 30 and engages the rectangular opening 31 in link 26. The link 26 is now rotated clockwise until its end 32 comes in contact with the inside face of wall 20 and this rotation motion of the key is continued very slightly while side 21 is flexed inwardly by inward pressure on the head of the key which is in contact with the outer surface of the bolt head 24. The end 32 of the locking link 26 now slides inwardly on the inner surface of wall 20 until it snaps into slot 33 and the slight clockwise rotating motion being applied to the key will cause the end 32 of the locking link 26 to reach the bottom of slot 33 and continue into slot 34, and by relaxing the inward pressure on the key the flexing of side 21 will cause the end 32 of the locking link to come to rest in slot 34 and out of line with slot 33 therefor reaching the locking position of the hitch box cover.

Thus the wall of slot 34 acts as abutment or stop which prevents the cylindrical head of the bolt from being pushed out of the opening 14 for enough to allow the hitch box cover to be drawn out of the hitch box.

To unlock and remove the hitch box cover from the hitch box the key is passed thru the slot 30 until it engages the slot 31 of the locking link 26. Now push the key further inward so that the large outer end of the key presses against the bolt head 24 and further pressure on the key will cause wall 21 to flex and the end 32 of the locking link 26 will be in line with slot 33 in wall 20, holding this pressure on the key and rotating the key counter clockwise until the end 32 of the locking link 26 is disengaged from slot 33 in wall 20. Now holding the end 32 of link 26 by means of the key in this position and reducing the axial pressure on 24 so that the flexing action of side 21 will bring side 21 back in contact with the inside surface of 16. Now remove the key from slots 31 and 30. With one of the fingers of the right hand press 24 inward until the outside surface of 24 is just beyond the inside of wall 16. Holding 24 in this position and with the left hand remove the hitch box cover from the hitch box.

The pressure relationship between walls 19 and 21 and walls 15 and 16 respectively may be increased if desired by the provision of a compression spring 35 interposed between wall 19 and 21 of the hitch box cover and held in place by suitable means such as welding or riveting.

In view of the flexible walls 19 and 21 of the hitch box cover the body 18 of the hitch box cover is of such construction as to compensate in some degree for variation in the inside sizes of the hitch boxes to eliminate loose fits which might cause some rattle when using the hitch box cover that is designed for that size hitch box. If desired the facing 23 of the hitch box cover can be provided with a flourescent material to serve as an additional warning indicator easily seen by vehicles approaching from the rear. The hitch box cover is designed for low cost production thru the use of standard materials and availability of most of the parts on the open market.

What is claimed is:

1. A hitch box cover for a hitch box having an open end and an opening in a side thereof comprising a body shaped for insertion in the open end of the hitch box, a key operated locking mechanism attached to said body and having a part biased to enter the opening in the hitch box upon insertion of said body into the hitch box to restrain the body from withdrawal from hitch box, and key actuated means comprising a part of said locking mechanism to restrain retraction of said part from said opening and in which said body includes first, second, third and fourth walls with said locking mechanism mounted on the fourth wall, said fourth wall being free at one end and biased away from the first wall to hold two walls against opposed faces of the hitch box.

2. A hitch box cover for a hitch box having an open end and an opening in a side thereof comprising a body shaped for insertion in the open end of the hitch box, a key operated locking mechanism attached to said body and having a part biased to enter the opening in the hitch box upon insertion of said body into the hitch box to restrain the body from withdrawal from hitch box and key actuated means comprising a part of said locking mechanism to restrain retraction of said part from said opening and in which said body comprises first, second, third and fourth walls, said second and fourth walls being flexible and normally at an obtuse angle with respect to the first wall, to be flexed toward each other upon insertion of the body in the hitch box, said locking mechanism being mounted on the fourth wall, and said third wall comprising an abutment for the locking link to restrain flexure of the fourth wall and retraction of said part from said opening.

3. A hitch box cover for a hitch box having an open end and an opening in a side thereof comprising a body shaped for insertion in the open end of the hitch box, a key operated locking mechanism attached to said body and having a part biased to enter the opening in the hitch box upon insertion of said body into the hitch box to restrain the body from withdrawal from hitch box and key actuated means comprising a part of said locking mechanism to restrain retraction of said part from said opening and in which said body includes opposed walls for engagement with opposite inside faces of the hitch box and in which the locking mechanism is mounted on one of the walls and in which two of said walls being flexible with respect to another wall and a compression spring interposed between the flexible walls.

* * * * *